Feb. 2, 1954    R. B. HUNTER ET AL    2,668,268
LOAD RELAY CIRCUIT FOR INDUCTION MOTORS
Filed April 28, 1952
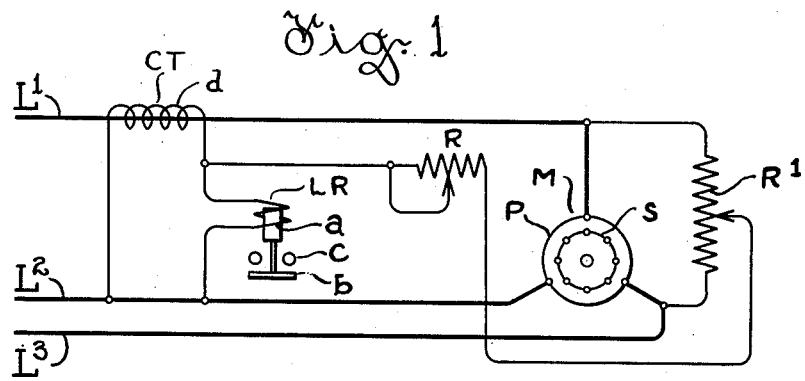
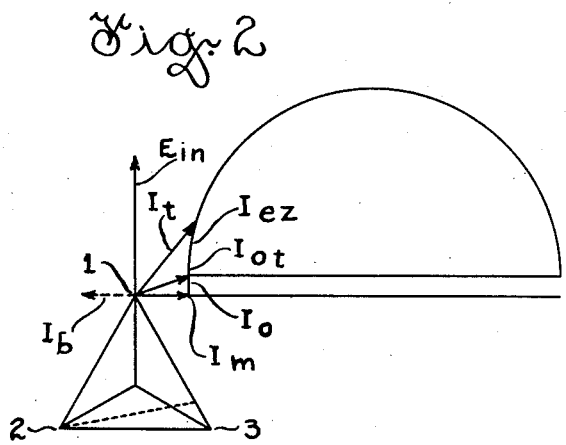
Inventors
Richard B. Hunter
Eric Pell
Norbert L. Schmitz
By W. Chyou
Attorney

UNITED STATES PATENT OFFICE 2,668,268

LOAD RELAY CIRCUIT FOR INDUCTION MOTORS

Richard B. Hunter, Cuernavaca, Morelos, Mexico, and Eric Pell, Shorewood, and Norbert L. Schmitz, Madison, Wis., assignors to Cutler-Hammer, Inc., Milwaukee, Wis., a corporation of Delaware Application April 28, 1952, Serial No. 284,736

2 Claims. (Cl. 318—474)

This invention relates to a load relay circuit for induction motor systems.

The present application is a continuation in part of our application Serial No. 552,046, filed August 31, 1944, now Patent No. 2,620,464.

Where a current relay is employed in connection with an induction motor for measuring loads it is in some instances important that the relay be free from the influence of certain of the components of the total primary current, and it is an object of the present invention to provide a relay circuit effective to protect the relay against such undesirable influence.

More particularly the invention has among its objects to provide a relay circuit which will free the relay from the influence of such components as the magnetizing current and the no load current, thereby to render the relay controllable substantially exclusively by the load component of the total primary current.

Another object is to provide such a relay circuit especially advantageous for use in hoisting and lowering systems where high speed lowering of a light load is desired and where the load measuring means relied upon must be reliable and accurate.

Other objects and advantages of the invention will hereinafter appear.

The accompanying drawings illustrate an embodiment of the invention which will now be described, it being understood that the embodiment illustrated is susceptible of various modifications without departing from the scope of the appended claims:

In the drawing,

Figure 1 shows a preferred relay circuit, and

Fig. 2 shows the voltage and current relations of one phase of an induction motor.

Referring to Fig. 1, the same shows an induction motor M having a primary P and a secondary S which may be of the slip ring type or of the squirrel cage type. The primary of the motor is shown as supplied with power from lines $L^1$, $L^2$ and $L^3$, the usual means for controlling the power connections being omitted for simplicity of illustration. As will be understood, the motor secondary if of the slip ring type may be provided with control of any of various well known types.

Further referring to Fig. 1, it shows a load relay LR which may be of any suitable construction. For simplicity of illustration the load relay is shown diagrammatically as comprising a winding $a$ responsive to lift a movable contact element $b$ which has associated therewith stationary contacts $c$ to be bridged thereby. As shown the contacts $c$ are adapted to be bridged by element $b$ upon response of the winding $a$, but as will be understood the contacts $c$ might be normally bridged by element $b$ and disengaged thereby upon response of winding $a$. The winding $a$ is shown as connected at one end to supply line $L^2$ and at its other end to one end of a current coil $d$ of a current transformer CT associated with supply line $L^1$. The other end of current coil $d$ is connected to supply line $L^2$. The point common between winding $a$ and coil $d$ is connected in series with an adjustable resistor R to the adjusting element of a potentiometer rheostat $R^1$ which has its resistance element connected across supply lines $L^1$ and $L^3$.

As will be understood the current transformer CT tends to subject the winding $a$ of load relay LR to a current proportional to the total primary current. However, a portion of such current is bucked out by a current flowing from supply line $L^2$ through winding $a$, adjustable resistor R, the adjusting element and the lower portion of the resistance element of rheostat $R^1$ to supply line $L^3$. Reference will now be made to Fig. 2 in further explaining the circuit described.

In Fig. 2, the triangle 1, 2, 3 represents the line and phase to neutral voltages, $I_m$ the magnetizing current at rated voltage, $I_o$ the no load loss, $I_{ot}$ the no load total primary current, $I_{ez}$ the load component of the current for a certain load, and $I_t$ the total primary current at such load, $I_t$ being the sum of all the aforementioned components. The phase to neutral voltage of phase 1 is represented by the vector $E_{1n}$ and the magnetizing current of this phase is lagging such voltage by 90 degrees. To buck out the magnetizing component there is depicted an equal and oppositely directed component $I_b$. The portion of the circuit aforedescribed, inclusive of winding $a$, adjustable resistor R, the adjusting element and lower portion of rheostat $R^1$ provide the aforementioned component $I_b$ which bucks out the magnetizing compound $I_m$, which is a component of the current produced in the current coil $d$ of transformer CT. Such component $I_b$ can also be provided by connecting the right hand end of adjustable resistor directly to supply line $L^3$. However, the connection as shown in Fig. 1 enables bucking out the magnetizing current component and also some of the load component. The adjustable resistor R and rheostat $R^1$, for example, can be adjusted for bucking out the no load current component $I_{ot}$. The effective current flowing through the winding $a$ of relay LR will be equal to the difference between the total primary and the bucking component, and thus the relay will be rendered effective to measure and will be responsive to the load component of the primary current.

We claim:

1. In combination, a polyphase motor, a polyphase alternating current supply therefor, a current transformer deriving from one phase of the motor primary a first current, a single coil relay having its coil connected to one side of said one phase of the motor primary and in series circuit with said current transformer, and means in series circuit with said current transformer and said coil of said relay to subject the latter to a second current proportional the voltage across another phase of the motor primary, said means including an adjustable resistor for adjusting said second current to bear a given relation to certain components of the motor primary and thereby render said relay sensitive to the load component of the motor primary with certain of the current components of the motor primary bucked out according to the adjustment of said second current.

2. In combination, a polyphase motor, a polyphase alternating current supply therefor, a current transformer deriving from one phase of the motor primary a first current, a single coil relay having its coil connected to one side of said one phase of the motor primary and in series circuit with said current transformer, a rheostat having its resistor connected across another phase of the motor primary, and means including an adjustable resistor connected in circuit with the adjusting element of said rheostat and the point common to the connection between said current transformer and said coil of said relay to subject the latter to a second current, adjustable in accordance with the setting of said rheostat and said adjustable resistor to bear a given relation to certain components of the motor primary, to thereby render said relay sensitive to the load component of the motor primary with certain of the current components of the motor primary bucked out.

RICHARD B. HUNTER.
ERIC PELL.
NORBERT L. SCHMITZ.

References Cited in the file of this patent

UNITED STATES PATENTS

| Number | Name | Date |
|---|---|---|
| 1,072,132 | Lutz | Sept. 2, 1913 |
| 1,923,754 | Seeley | Aug. 22, 1933 |
| 2,062,135 | Lilja | Nov. 24, 1936 |
| 2,117,839 | Chubb | May 17, 1938 |
| 2,247,506 | Kutcher et al. | July 1, 1941 |
| 2,469,706 | Winther | May 10, 1949 |

FOREIGN PATENTS

| Number | Country | Date |
|---|---|---|
| 692,554 | Germany | Dec. 2, 1952 |